(12) United States Patent
Edler et al.

(10) Patent No.: US 11,149,886 B1
(45) Date of Patent: Oct. 19, 2021

(54) SLIDE VALVE SAFETY COUPLER

(71) Applicant: Plews, Inc., Dixon, IL (US)

(72) Inventors: Edward M. Edler, Pearl City, IL (US); Jamie Schaeffer, Dixon, IL (US)

(73) Assignee: Plews, Inc., Dixon, IL (US)

( * ) Notice: Subject to any disclaimer, the term of this patent is extended or adjusted under 35 U.S.C. 154(b) by 0 days.

(21) Appl. No.: 16/945,692

(22) Filed: Jul. 31, 2020

(51) Int. Cl.
*F16L 29/02* (2006.01)
*F16L 37/23* (2006.01)

(52) U.S. Cl.
CPC .............. *F16L 29/02* (2013.01); *F16L 37/23* (2013.01)

(58) Field of Classification Search
CPC .................................. F16L 29/02; F16L 37/23
USPC ............................................. 251/149.6, 149.1
See application file for complete search history.

(56) References Cited

U.S. PATENT DOCUMENTS

| | | | | |
|---|---|---|---|---|
| 3,106,378 A * | 10/1963 | Hellstern | ............... | F16L 37/46 251/149.9 |
| 3,106,379 A * | 10/1963 | Sciuto et al. | ........... | F16L 37/23 251/149.9 |
| 3,127,149 A * | 3/1964 | Cruse | ...................... | F16L 37/46 251/149.9 |
| 4,465,097 A * | 8/1984 | Suzuki et al. | ......... | F16L 37/23 137/614.04 |
| 4,494,728 A * | 1/1985 | Cruse | ...................... | F16L 37/23 251/149.9 |
| 5,967,491 A * | 10/1999 | Magnuson et al. | ..... | F16L 37/23 137/614.05 |
| 6,702,254 B2 * | 3/2004 | Noble et al. | ............ | F16L 37/23 251/149.1 |

* cited by examiner

*Primary Examiner* — Kevin L Lee

(57) ABSTRACT

A safety coupler for an air hose terminating in a plug. The plug has a passageway between its first and second ends for the passage of air there through. The coupler member has upstream and downstream ends and first body coupler passageway sized for receiving a first cylindrical section of the plug and terminating in a washer. A sleeve coupler and spring for biasing the sleeve coupler towards the coupler member upstream end, the sleeve coupler terminating at its coupler member upstream end by a bushing plug being sized to create a shoulder for abutting a raised stop of the plug. A reduced diameter plug receiving passageway is located downstream of the sleeve coupler and is sized to receive the plug and for receiving pressurized air passing through the plug passageway, and a sleeve slide valve threadably engageable to the washer such that when the plug enters the coupler member, the plug having a raised stop abuts the first body coupler resulting in the washer being displaced towards the coupler member downstream end whereupon the sleeve slide valve threadably captures the washer preventing the plug from disconnecting from the coupler member.

15 Claims, 3 Drawing Sheets

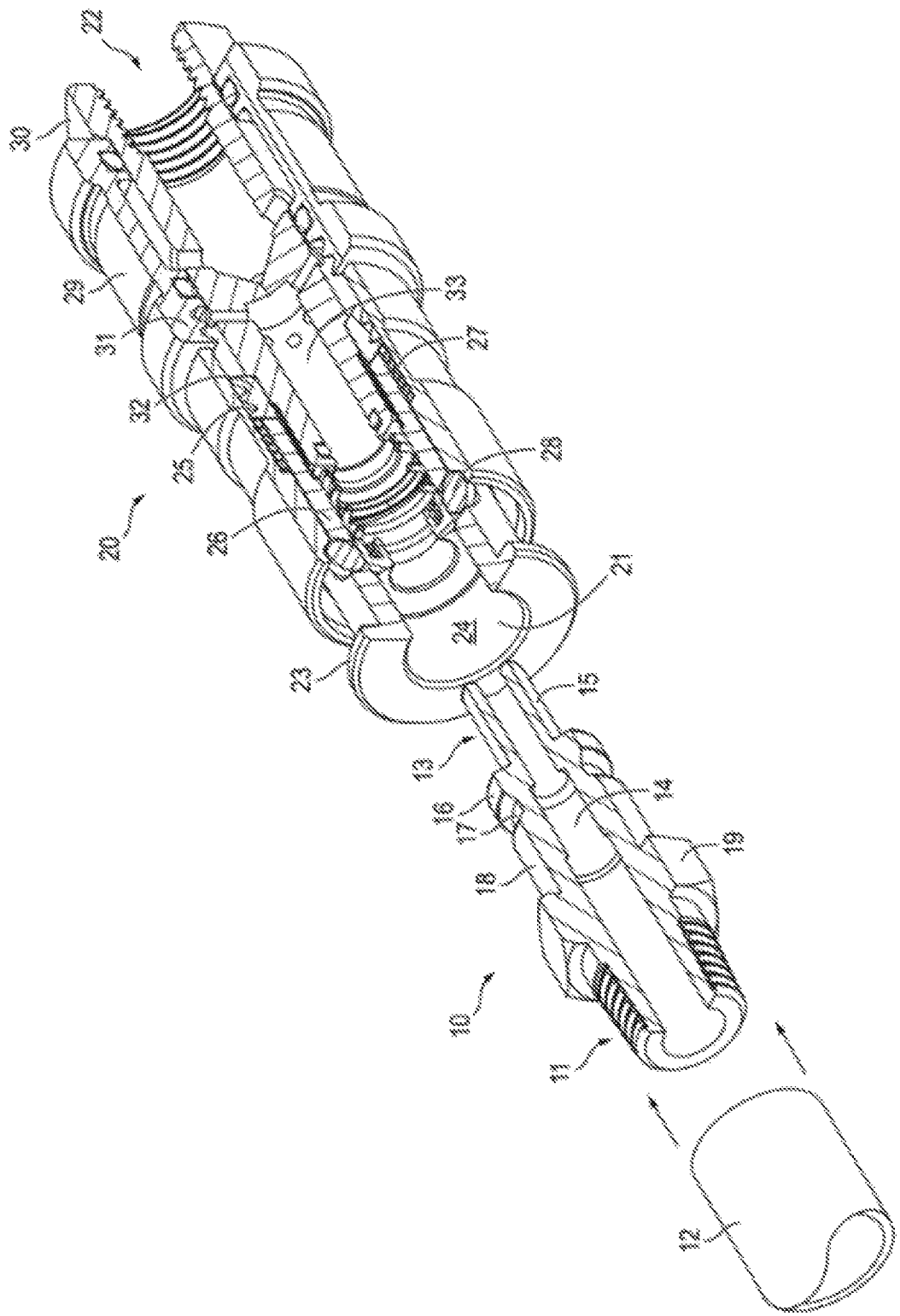

SLIDE VALVE SAFETY COUPLER

TECHNICAL FIELD

The present invention is directed to a safety coupler for an air hose. Under high pressure conditions, it is essential that the interface between air hoses and the tools that they power remains secure to prevent injury. The present coupler provides a simple yet effective means of maintaining a continuous connection until the interface is depressurized and the air hose at its terminal plug is released by a user.

BACKGROUND OF THE INVENTION

Compressed air hoses usually include quick-connect couplings for connecting tools to a pressurized air source. The coupling receives a plug attached to a hose carrying pressurized air and, in turn, is attached to the appropriate tool. Both the plug and coupler include an axial bore through which the compressed air moves.

Typical of prior couplings is described in U.S. Pat. No. 2,279,146 which teaches the use of pins with the male portion (fitting F) generally attached by a length of hose to an air chamber of the tool or other implement. When the coupling is released, the coupler is of necessity held by the person grasping its collar. The section of the hose attached the plug, however, is filled with compressed air and may whip about in a dangerous manner when released.

To address this issue, safety couplings have been suggested which provide for two-stage release of the plug and coupler. In the first stage, the plug moves sufficiently to permit air in its hose to be released and in its second stage, the plug itself is released. Such a plug, however, is expensive to manufacture and requires two separate operations and is cumbersome and time-consuming to use.

Yet another example of a quick coupling for pressurized air is taught by U.S. Pat. No. 5,535,985 wherein a male portion is inserted into a female portion of the coupler which comprises a latch having teeth which are arranged on either side of the male portion in order to cooperate with holding means, thus as to require disengagement of the male portion from the female portion in two phases corresponding to the pressing and releasing of a latch. The female portion comprises a valve which is urged toward its closed position when the male and female portions are disengaged and which is open as result of the insertion of the male portion into the female portion. Such an approach requires a rather complex design requiring the operator to align the teeth of the male and female portions and which may be subject to failure as the teeth may be subject to breakage and wear over time.

Regardless of the approach taken by others, it remains a priority to provide a coupler which is not only wear resistant but also prevents accidental disengagement of the coupler and its dependent tool and compressed air hose both during use and while the air hose is pressurized.

It is thus an object of the present invention to provide a safety coupler for an air hose which is free of complex parts which may be subject to breakage.

It is still a further object of the present invention to provide a safety coupler which prevents the inadvertent release of an air hose from a downstream tool for as long as the air hose is pressurized.

These and further objects to be more readily apparent when considering the following disclosure and appended claims.

SUMMARY OF THE INVENTION

A safety coupler for an air hose, the safety coupler comprising:

a plug comprising a plug first end adapted for connection to an air hose and a plug second end and plug passageway between said plug first and plug second ends for the passage of air there through;

a coupler member comprising:

a plug receiving chamber; and a coupler pressure receiving passageway;

wherein said coupler pressure receiving passageway comprises a plurality of radial coupler receiving passageway openings and air lines sized to enable said safety coupler to operate between approximately 300 and 600 psi.

A safety coupler for an air hose, the safety coupler comprising:

a plug comprising a plug first end adapted for connection to an air hose and a plug second end and plug passageway between said plug first and plug second ends for the passage of air there through;

said plug further comprising substantially cylindrical sections, first cylindrical section extending from said plug second end and terminating in a raised shoulder and indent and a second cylindrical section extending from said raised shoulder and indent to said plug first end;

a coupler member comprising an outer perimeter and forward and rearward sleeves, said rearward sleeve having helical threads configured therein;

a bushing;

a retainer ball;

a plug receiving chamber;

a radial seal positioned at the entrance to said plug receiving chamber;

a bushing biasing spring for biasing said bushing towards said coupler member upstream end;

a sleeve biasing spring for biasing said forward sleeve towards said coupler member downstream end;

a washer captured on said coupler member, said washer having helical threads configured therein;

a coupler pressure receiving passageway having a plurality of coupler pressure receiving passageway openings;

a pressurized air receiving chamber sized to enable said safety coupler to operate between approximately 300 and 600 psi;

coupler receiving passageway air lines;

radial pressurized air receiving air lines;

a plurality of pressurized air receiving openings; and an annular passageway for selectively communicating pressurized air between said coupler pressure receiving passageway and said pressurized air receiving chamber;

wherein said bushing is held in position by said bushing biasing spring which further acts to retain said retainer ball at the outer perimeter of said coupler member downstream end acting to lock forward and rearward sleeves in preventing forward and rearward sleeves from moving with respect to one another when in said locked position; and wherein upon insertion of said plug into said coupler member at its downstream end, said radial seal seals against said plug first cylindrical section and said forward sleeve is biased by said sleeve biasing spring towards said coupler member downstream end and coupler member rearward sleeve is pushed toward said coupler member downstream end and rotated until contacted by said washer whereupon said washer helical threads engage said rearward sleeve helical threads and said retainer ball sits within said plug indent for locking said plug within said coupler member whereupon pressurized air is communicated from said coupler pressure receiving passageway through said coupler pressure receiving passageway openings and through said annular passageway, radial pressurized air receiving air lines and plurality of pressurized air receiving openings.

A method of selectively joining an air hose to a safety coupler operating between approximately 300 and 600 psi, said method comprising:

providing a plug and safety coupler wherein:

said plug comprises a plug first end adapted for connection to an air hose and a plug second end and plug passageway between said plug first and plug second ends for the passage of air there through;

said plug further comprising substantially cylindrical sections, first cylindrical section extending from said plug second end and terminating in a raised shoulder and indent and a second cylindrical section extending from said raised shoulder and indent to said plug first end;

said coupler member comprising an outer perimeter and forward and rearward sleeves, said rearward sleeve having helical threads configured therein;

a bushing;

a retainer ball;

a plug receiving chamber;

a radial seal positioned at the entrance to said plug receiving chamber; a bushing biasing spring for biasing said bushing towards said coupler member downstream end;

a sleeve biasing spring for biasing said forward sleeve towards said coupler member upstream end;

a washer captured on said coupler member, said washer having helical threads configured therein; and wherein said bushing is held in position by said bushing biasing spring which further acts to retain said retainer ball at the outer perimeter of said coupler member downstream end acting to lock forward and rearward sleeves in preventing forward and rearward sleeves from moving with respect to one another when in said locked position; and wherein said method comprising the insertion of said plug into said coupler member at its downstream end, said radial seal sealing against said plug first cylindrical section and said forward sleeve being biased by said sleeve biasing spring towards said coupler member downstream end and coupler member rearward sleeve being pushed toward said coupler member downstream end and rotated until contacted by said washer whereupon said washer helical threads engage said rearward sleeve helical threads causing said retainer ball to sit within said plug indent for locking said plug within said coupler member whereupon pressurized air is communicated from said coupler pressure receiving passageway through said coupler pressure receiving passageway openings and through said annular passageway, radial pressurized air receiving air lines and plurality of pressurized air receiving openings.

BRIEF DESCRIPTION OF THE FIGURES

FIG. 1 is a perspective view of the safety coupler and plug of the present invention prior to plug insertion within the coupler.

DETAILED DESCRIPTION OF THE INVENTION

Figure 3:
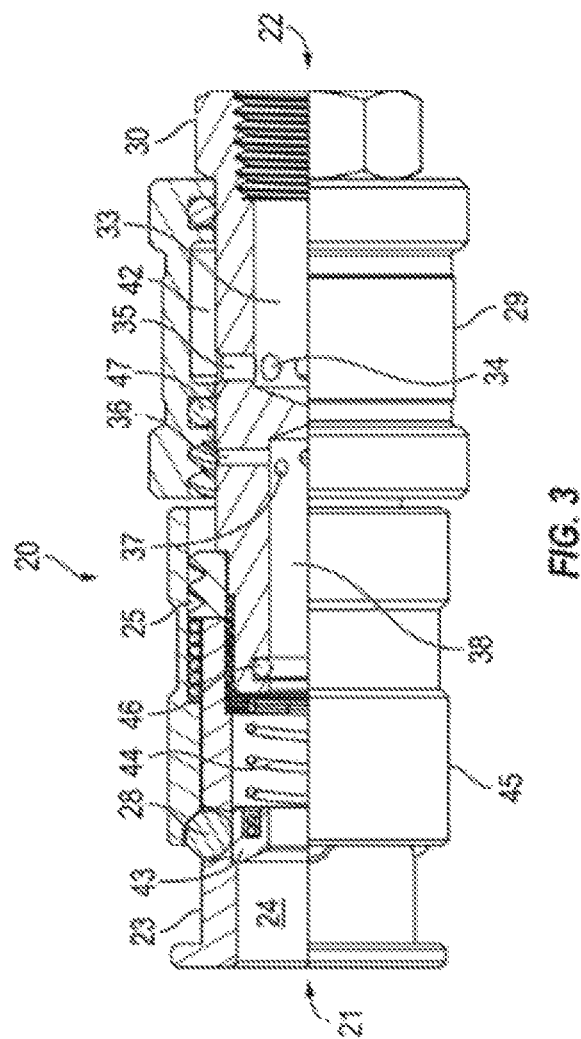
FIG. 3 is a side partial cutaway view of the safety coupler of the present invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

As noted previously, the present invention is directed to a safety coupler for an air hose. Under high pressure conditions, it is essential that the interface between air hoses and the tools that they power remains secure to prevent injury. The present coupler provides a simple yet effective means of maintaining a continuous connection until the interface is depressurized and the air hose at its terminal plug is released by a user. Reference is now made to the following discussion and appended drawings. This is particularly important in this environment as the present coupler is characterized as having a working pressure of between approximately 300 and 600 psi while conventional couplers operate at approximately 120 psi.

Figure 2:
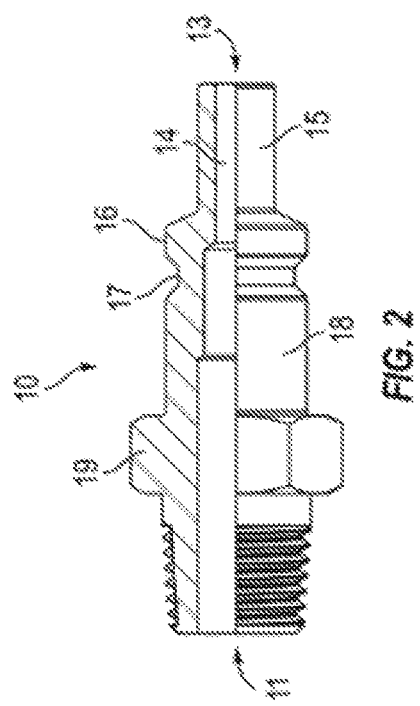
FIG. 2 is a side partial cutaway view of the plug for use in practicing the present invention.
Figure 4:
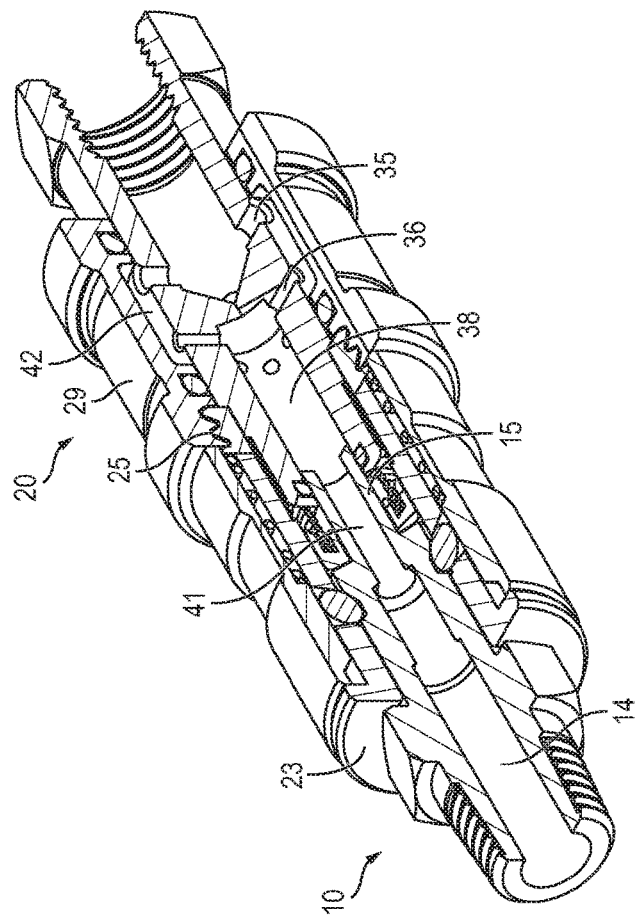
FIG. 4 is a perspective partial cutaway view of the safety coupler of the present invention having received the plug appended to a suitable air tool (not shown).
Figure 5:
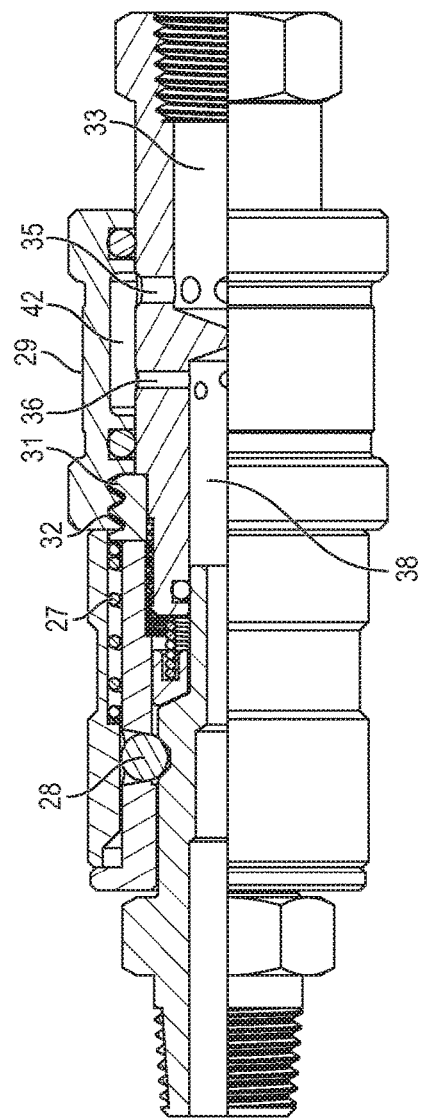
FIG. 5 is a side partial cutaway view of the safety coupler and plug in the orientation depicted in FIG. 4.

In further reference to the various figures, coupler 20 includes coupler pressurized receiving passageway 33 which retains pressurized air therein by blockage of coupler receiving passageway openings 34 and thus prevents pressurized air from communicating with pressurized air receiving chamber 38 (FIGS. 1 and 2). However, when plug 10 is securely seated within coupler 20 and retained therein by rearward sleeve 29, pressurized air within coupler receiving passageway 33 directly communicates with air receiving chamber 38 through coupler receiving passageway openings 34, coupler receiving passageway air lines 35, annular passageway 42 and pressurized air receiving chamber radial air lines 36 which communicate with a series of pressurized air receiving openings 37 configured within pressurized air receiving chamber 38. As preferred embodiments, the safety coupler of the present invention is further characterized as having pressurized air receiving openings 37 which are offset on different centerlines as illustrated in each of the figures.

It should further be noted that, as preferred embodiments, radial air lines 36 as well as pressurized air receiving openings 37 each have a minimum diameter not greater than 0.090 inches for if they were larger, when operated at a maximum rated pressure of 600 psi, coupler member rearward sleeve 29 cannot be moved from its "on" to its "off" position while exerting a reasonable amount of force. The present coupler is intended to operate between 300 and 600 psi. It was further found that if radial air lines 36 and pressurized air receiving openings 37 were larger than 0.090 inches in diameter, radial seal damage was observed when coupler member rearward sleeve 29 was moved from its "on" to its "off" position. As noted above, as a further preferred embodiment, it is recommended that radial air lines 36 with pressurized air receiving openings 37 are capped at no greater than eight in number and are offset by at least 0.020 inches as depicted in each of the figures. Correspondingly, O ring 47 of coupler member rearward sleeve 29 sequentially travels over a first subset of radial air lines 36 and then a second subset of radial air lines 36 as it is moved towards the upstream end and the "off" position. Other offset patterns may be employed as desired, but any suitable configuration that allows 0 ring 47 to move across air lines 36 asynchronously reduces the amount of force required to operate coupler member rearward sleeve 29. As noted the present coupler is unique in that it employs two or more sets of partial passageways that are spaced apart or otherwise offset, the passageways, including the radial pressurized air lines 36 and pressurized air receiving openings 37, each having a section with the minimum diameter being no larger than 0.090 inches in diameter even if other portions have a greater diameter, such as by being chamfered.

Plug 10 is further characterized by substantially cylindrical sections, a first cylindrical section 15 extending from second end 13 and terminating in raised shoulder 16 and indent 17 and second cylindrical section 18 extending from raised shoulder 16 and indent 17 to first end 11, second cylindrical section 18 supporting raised stop 19 as shown.

Coupler member 20 is characterized as having downstream end 21 and upstream end 22. Coupler member 20 includes first body coupler 23 and first body coupler passageway 24 sized for receiving first cylindrical section 15 of plug 10 and second body coupler 30 for mating with the pair hose. As shown, first body coupler 23 and second body coupler 30 cooperate, such as by threading together, to capture washer 25 having threads 32.

In operation, bushing 43 is held in position by bushing biasing spring 44 which also holds retaining ball 28 in the outer perimeter of coupler body 23 when plug 10 is not installed. This locks forward and rearward sleeves 45 and 29 in their "off" position such that pressurized gas is not supplied to plug 10. This prevents the passage of pressurized gas without plug 10 being stalled within coupler 20.

Once plug 10 is installed, O ring 46 seals against the surface of plug first cylindrical section 15. This is a push-to-connect type of coupling so that when plug 10 is installed within coupler 20, forward sleeve 45 is pushed towards coupler member downstream end by sleeve biasing spring 27 thereupon rearward sleeve 29 with internal quad start threads 31 is pushed forward until it makes contact with washer 25 having external quad start threads 32. Rotating rearward sleeve 29 clockwise will move rearward sleeve 29 father forward until it makes contact with forward sleeve 45 locking both in the "on" position, whereupon retainer ball 28 seats within plug indent 17 as shown.

To remove plug 10, rearward sleeve 29 is rotated counterclockwise until quad start threads 31 of rearward sleeve 29 and external start threads 32 of washer 25 are disengaged. Rearward sleeve 29 is then moved back toward coupler upstream end 22 internal upstream air pressure is then relieved to the atmosphere.

Forward sleeve 45 is moved back releasing plug 10 and bushing 43 and forward by bushing biasing spring 44 while holding retaining ball 28 at the perimeter of coupler 20 as shown in FIGS. 1 and 3 while locking forward and rearward sleeves 45 and 29 in their "off" position.

In further reference to the various figures, coupler 20 includes coupler pressure receiving passageway 33 which retains pressurized air therein and prevents pressurized air from communicating with pressurized air receiving chamber 38 (FIGS. 1 and 2). However, when plug 10 is securely seated within coupler 20 and retained therein by sleeve slide valve 29, pressurized air within passageway 33 directly communicates sequentially through openings 34 into air lines 35, across annular passage 42, into air lines 36 and finally through openings 37 with receiving chamber 38.

Thus, what has been illustrated and described is a simple yet effective means of maintaining a continuous connection between a source of high pressure air and a tool configured to use it safely and effectively providing the user with complete control to prevent release of the tool and its plug until the system is depressurized and the air hose at its terminal plug is released by a user.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

The invention claimed is:

1. A safety coupler for an air hose, the safety coupler comprising:
   a plug comprising a plug first end adapted for connection to an air hose and a plug second end and plug passageway between said plug first and plug second ends for the passage of air there through;
   a coupler member comprising:
   a plug receiving chamber;
   a coupler pressure receiving passageway, wherein said coupler pressure receiving passageway comprises a plurality of radial coupler receiving passageway openings and air lines sized to enable said safety coupler to operate between approximately 300 and 600 psi; and
   an air receiving chamber fed by a plurality of air lines with pressurized air receiving openings having longitudinally offset centerlines.

2. The safety coupler of claim 1 wherein said pressurized air receiving openings are offset greater than or equal to approximately 0.020 inches.

3. The safety coupler of claim 1 wherein each of said pressurized air receiving openings and air lines have a minimum diameter not greater than 0.090 inches.

4. A safety coupler for an air hose, the safety coupler comprising:
- a plug comprising a plug first end adapted for connection to an air hose and a plug second end and plug passageway between said plug first and plug second ends for the passage of air there through;
- said plug further comprising substantially cylindrical sections, a first cylindrical section extending from said plug second end and terminating in a raised shoulder and indent and a second cylindrical section extending from said raised shoulder and indent to said plug first end; a coupler member comprising an outer perimeter and forward and rearward sleeves, said rearward sleeve having helical threads configured therein;
- a bushing;
- a retainer ball;
- a plug receiving chamber;
- a radial seal positioned at the entrance to said plug receiving chamber;
- a bushing biasing spring for biasing said bushing towards said coupler member upstream end;
- a sleeve biasing spring for biasing said forward sleeve towards said coupler member downstream end;
- a washer captured on said coupler member, said washer having helical threads configured therein;
- a coupler pressure receiving passageway having a plurality of coupler pressure receiving passageway openings;
- a pressurized air receiving chamber sized to enable said safety coupler to operate between approximately 300 and 600 psi;
- coupler receiving passageway air lines;
- radial pressurized air receiving air lines;
- a plurality of pressurized air receiving openings; and
- an annular passageway for selectively communicating pressurized air between said coupler pressure receiving passageway and said pressurized air receiving chamber;

wherein said bushing is held in position by said bushing biasing spring which further acts to retain said retainer ball at the outer perimeter of said coupler member downstream end acting to lock forward and rearward sleeves in preventing forward and rearward sleeves from moving with respect to one another when in said locked position; and wherein upon insertion of said plug into said coupler member at its downstream end, said radial seal seals against said plug first cylindrical section and said forward sleeve is biased by said sleeve biasing spring towards said coupler member downstream end and coupler member rearward sleeve is pushed toward said coupler member downstream end and rotated until contacted by said washer whereupon said washer helical threads engage said rearward sleeve helical threads and said retainer ball sits within said plug indent for locking said plug within said coupler member whereupon pressurized air is communicated from said coupler pressure receiving passageway through said coupler pressure receiving passageway openings and through said annular passageway, radial pressurized air receiving air lines and plurality of pressurized air receiving openings.

5. The safety coupler of claim 4, wherein said pressurized air receiving openings are offset greater than or equal to approximately 0.020 inches.

6. The safety coupler of claim 4 wherein said coupler radial pressurized air receiving air lines have a minimum diameter not greater than 0.090 inches.

7. The safety coupler of claim 4 wherein said plurality of pressurized air receiving openings have a minimum diameter not greater than 0.090 inches.

8. The safety coupler of claim 6 wherein said radial pressurized air receiving air lines are not greater than eight in number.

9. The safety coupler of claim 7 wherein said plurality of pressurized air receiving openings are not greater than eight in number.

10. A method of selectively joining an air hose to a safety coupler operating between proximally 300 and 600 psi, said method comprising:
providing a plug and safety coupler wherein:
- said plug comprises a plug first end adapted for connection to an air hose and a plug second end and plug passageway between said plug first and plug second ends for the passage of air there through;
- said plug further comprising substantially cylindrical sections, a first cylindrical section extending from said plug second end and terminating in a raised shoulder and indent and a second cylindrical section extending from said raised shoulder and indent to said plug first end;
- said coupler member comprising an outer perimeter and forward and rearward sleeves, said rearward sleeve having helical threads configured therein;
- a bushing;
- a retainer ball;
- a plug receiving chamber;
- a radial seal positioned at the entrance to said plug receiving chamber;
- a bushing biasing spring for biasing said bushing towards said coupler member upstream end;
- a sleeve biasing spring for biasing said forward sleeve towards said coupler member downstream end;
- a washer captured on said coupler member, said washer having helical threads configured therein;
- a coupler pressure receiving passageway having a plurality of coupler pressure receiving passageway openings;
- a pressurized air receiving chamber;
- coupler receiving passageway air lines;
- radial pressurized air receiving air lines;
- a plurality of pressurized air receiving openings; and
- an annular passageway for selectively communicating pressurized air between said coupler pressure receiving passageway and said pressurized air receiving chamber;

wherein said bushing is held in position by said bushing biasing spring which further acts to retain said retainer ball at the outer perimeter of said coupler member downstream end acting to lock forward and rearward sleeves in preventing forward and rearward sleeves from moving with respect to one another when in said locked position;

said method comprising inserting said plug into said coupler member at its downstream end, whereupon said radial seal seals against said plug first cylindrical section and said forward sleeve is biased by said sleeve biasing spring towards said coupler member downstream end and coupler member rearward sleeve is pushed toward said coupler member downstream end and rotated until contacted by said washer whereupon said washer helical threads engage said rearward sleeve helical threads and said retainer ball sits within said plug indent for locking said plug within said coupler member whereupon pressurized air is communicated from said coupler pressure receiving passageway through said coupler pressure receiving passageway openings and through said annular passageway, radial pressurized air receiving air lines and plurality of pressurized air receiving openings.

11. The method of claim 10 wherein said air hose is disengaged from said safety coupler by rotating said coupler member rearward sleeve to disengage said coupler member rearward sleeve from said washer and moving said coupler member rearward sleeve towards said coupler member upstream end.

12. The method of claim 10, wherein said radial pressurized air lines and pressurized air receiving openings are offset such that moving said coupler member rearward sleeve towards said coupler member upstream end disengages them asynchronously.

13. The method of claim 11 wherein upon moving said coupler member rearward sleeve toward coupler member upstream end, coupler member forward sleeve releases said plug, said bushing being urged by said bushing biasing spring toward said coupler member upstream end moving retainer ball toward said coupler member outer perimeter and said forward and rearward sleeves being blocked from moving with respect to one another.

14. A method of selectively joining an air hose to a safety coupler operating between proximally 300 and 600 psi, said method comprising:
  providing a plug and safety coupler wherein:
  said plug comprises a plug first end adapted for connection to an air hose and a plug second end and plug passageway between said plug first and plug second ends for the passage of air there through and said safety coupler comprising a plug receiving chamber, an air receiving chamber fed by a plurality of air lines with pressurized air receiving openings having longitudinally offset centerlines, and a radial seal carried by a rearward sleeve;
  inserting said plug into said safety coupler at its downstream end; and
  pushing said rearward sleeve downstream so that said radial seal is advanced over said offset pressurized air receiving openings asynchronously.

15. The method of claim 14, further comprising removing said plug from said safety coupler by moving said rearward sleeve towards said safety coupler member upstream end so that said radial seal is retracted over said offset pressurized air receiving openings end asynchronously.

* * * * *